M. KERN.
TROLLEY POLE CONTROLLING MECHANISM.
APPLICATION FILED AUG. 23, 1909.
992,360.
Patented May 16, 1911.
2 SHEETS—SHEET 1.
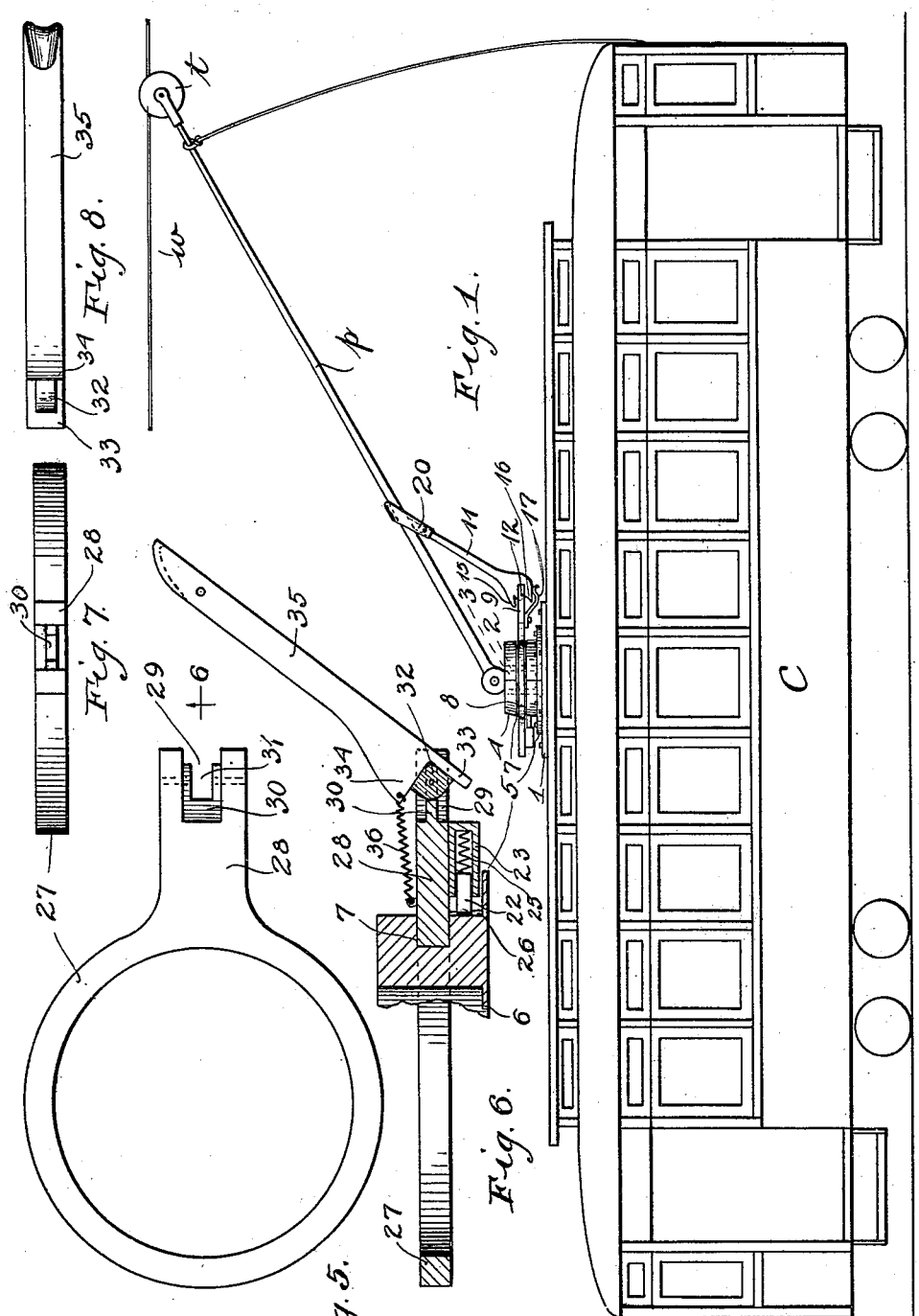
Witnesses:
Inventor:
Michael Kern,
By George S. Orvis
Atty.

M. KERN.
TROLLEY POLE CONTROLLING MECHANISM.
APPLICATION FILED AUG. 23, 1909.
992,360.
Patented May 16, 1911.
2 SHEETS—SHEET 2.
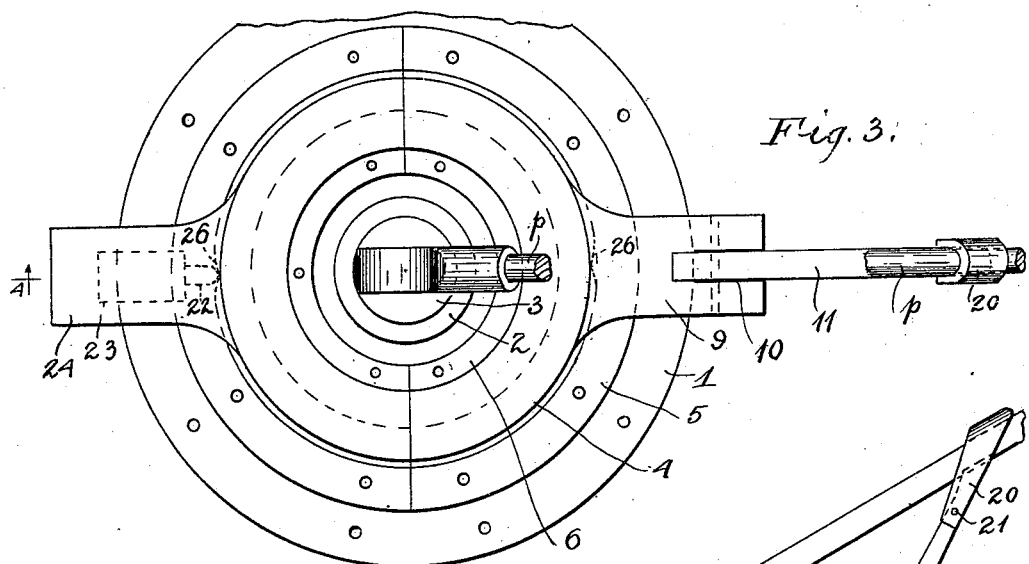
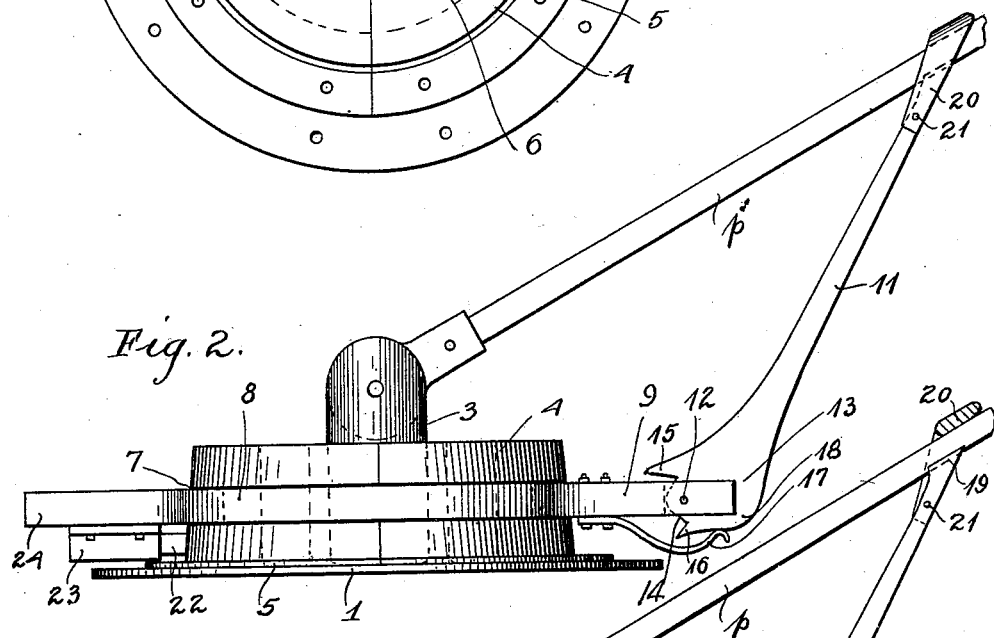
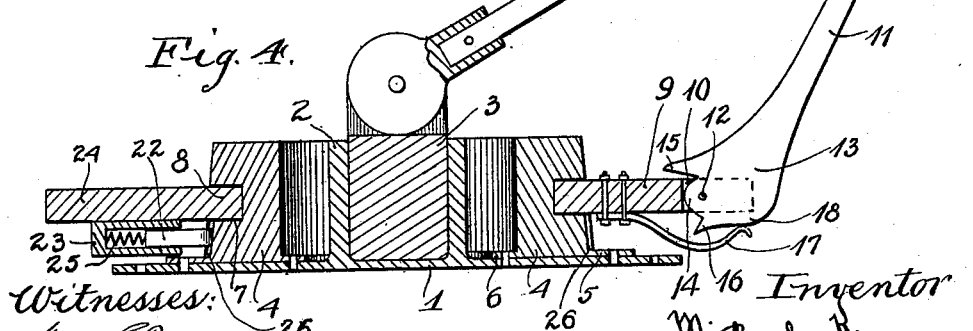
Witnesses:
Inventor
Michael Kern
By George S. Innes
Atty.

UNITED STATES PATENT OFFICE.

MICHAEL KERN, OF CHICAGO, ILLINOIS.

TROLLEY-POLE-CONTROLLING MECHANISM.

992,360.  Specification of Letters Patent.  Patented May 16, 1911.

Application filed August 23, 1909. Serial No. 514,215.

*To all whom it may concern:*

Be it known that I, MICHAEL KERN, a citizen of the United States, residing at Chicago, in the county of Cook and State of Illinois, have invented a new and useful Improvement in Trolley-Pole-Controlling Mechanism, of which the following is a specification.

My invention relates to trolley pole controlling mechanism and has for its object improved and simplified construction and arrangement and more efficient operation.

In the prior art more or less complicated and expensive spring mechanism is employed on the car top for holding the trolley pole up and against the wire and additional mechanisms generally known as trolley catchers are situated usually at the ends of the car for catching the trolley safe upon sudden upward movement of the pole, as where it leaves the wire, to prevent the pole from moving any distance above the wire after leaving it. Each car must, therefore, carry at least three distinct and separate mechanisms, one on the top of the car and one at each end.

The main object of my invention is to combine all the features of these mechanisms into one single mechanism on the car top. This single mechanism serves to hold up the pole against the trolley wire and will limit its upward movement should it leave the wire. The device will also prevent lateral swaying of the trolley pole.

In the accompanying drawing which clearly illustrates my invention, Figure 1 is a side elevation of a trolley car showing my improved device applied. Fig. 2 is an enlarged side elevation of the device. Fig. 3 is a top view of the device. Fig. 4 is a sectional view taken on plane 4, Fig. 3. Fig. 5, is a plan view of the rotary part of the device showing a modified arrangement. Fig. 6 is a sectional view taken on plane 6—6, Fig. 5, showing also the controlling arm. Fig. 7 is a side view from the right of Fig. 5, and Fig. 8 is a top view of the controlling arm.

On the roof of car C is secured a base plate 1 from which a bearing sleeve 2 extends upwardly and journals a stem 3 which at its upper end pivots the lower end of the trolley pole *p* which at its other end pivots trolley wheel *t* for engaging trolley wire *w*. Mounted concentrically on the base plate about the stem is an annular pillow block 4 which may be in one piece or of several pieces. The block at the outside of its lower edge has the horizontal flange 5 and at its inside lower edge has a flange 6, bolts passing through these flanges and through the base plate serving to secure the block in place. At about its middle, the block has an annular slot 7 in its outer side in which journals a ring 8 which may be integral or in sections secured together. From one side of the ring there is an extension forming a shelf 9 which at its end has a vertical bearing slot 10, in which is pivoted the trolley pole controlling arm 11 by means of a pin 12. This arm has the expanded body part 13 having a central rounded end 14 through which pin 12 passes, and the upper and lower stop ends 15 and 16. A leaf spring 17 is secured at its inner end to the underside of the shelf 9, its front end deflecting about the end 16 and engaging against the heel 18 of the body part 13 at some distance outside the pin 12, thus tending to swing the arm 11 upwardly and forwardly. The upper end 19 of the arm 11 is rounded out to receive the pole *p*, and a strap 20 engages about the pole and is pivoted at the ends of its legs to the arm at 21. The pole is thus always held to the arm but may move relatively to swing freely in vertical planes. The pole is also free to swing laterally, this movement being communicated through the arm 11 to ring 8 which rotates about the pillow block 4 in slot 7.

In Fig. 1, the trolley wheel engages the trolley wire and is held firmly yet yieldingly to the wire by the spring 17 acting on arm 11. The pole can freely slide through the strap 20 to vibrate in vertical planes as the car runs along. Should however the wheel leave the wire, the upward movement of the pole will be limited by the engagement of end 15 with the top of shelf 9, the pole immediately coming to rest without violent oscillation as is the case in poles as controlled in the prior art. The stop 15 is so situated that the pole can swing up only a small distance farther after the wheel leaves the wire. The end 16 is so situated that it will engage the under side of the shelf when the pole is brought into idle position adjacent the car top.

In order to prevent lateral swaying of the pole, a pawl 22 is provided, said pawl sliding in frame 23 secured to the shelf 24 extending from the ring 8 at the opposite side to shelf 9. A spring 25 in this frame forces the pawl outwardly toward the pillow block, the beveled pawl end coöperating with the locking notches 26 cut in the pillow block. The edges of the notches are curved and elongated as shown in Fig. 3, so that the ring can rotate through quite an angle with reference to the stationary pillow block without the pawl leaving the rounded edges. Where the car runs on straight track the pawl end engages the center of the notch so that the pole is locked against lateral swaying and held in a vertical plane of wire. When the car rounds a curve, the pawl end will leave the center of the notch and travel along a rounded edge, but will always remain on the rounded surface so that when the car again reaches straight track, the pawl end will seek the center of the notch to swing the ring back to return the pole to proper alinement with the wire. Thus the pole is always held in the proper position to most efficiently follow the wire and is prevented from swaying laterally as the car runs. When the car is to reverse its direction, the pole is swung around by the conductor until the pawl end engages in the opposite notch. When the pole is then released it will be swung upwardly and the wheel will engage truly with the wire without any further adjusting. In other devices considerable time is wasted in getting the pole in proper position so that the wheel will find the wire.

In Figs. 5, 6, 7 and 8, is shown a modified construction of the ring and controlling arm. The ring 27 has only the one shelf 28 having at its end the vertical slot 29. This slot has a horizontal web 30, having the end slot 31, in which pivots the vertical web 32 formed in the angle between ends 33 and 34 at the lower end of controlling arm 35. A tension spring 36 connecting between the end 34 and shelf 28 tends to pull the arm upwardly and forwardly to hold the trolley wheel to the wire. After the wheel leaves the wire further upward movement of the pole is limited by the engagement of end 34 with the web 30. When the pole is in its down position adjacent to the car roof the end 33 engages with the web. The end of the arm 35 is constructed and fitted with a strap, as in Figs. 1 to 4. Below the shelf 28 is also a frame 23 bearing a pawl 22, held by spring 25 against the pillow block to engage in notch 26, the exact location of the pawl frame on the ring being immaterial so long as the pawl engages in the notches to prevent swaying of the pole away from the vertical plane of the wire.

The unitary mechanism which I have described is simple and inexpensive, yet always effective and efficient in its control of the trolley pole whose operation is steadied and whose escape is checked. The pole is held securely against the wire and swaying thereof prevented and as soon as the wheel accidentally leaves the wire the pole is brought to rest. It is not necessary for the conductor to look at the pole to return it to the wire. He needs only to lower it and then release it, whereupon the wheel will itself find the wire by virtue of the pawl mechanism. The stop on the arm 11 positively prevents any great upward movement of the pole should it leave the wire, the upward movement being limited to that necessary only for the slight vertical vibration necessary during running conditions. The pole structure itself is also entirely free from cumbersome and heavy springs, the spring 17 on the ring 8, being sufficient to maintain good contact between the wheel and the wire.

I do not wish to be limited to the exact construction and arrangement shown and described as changes and modifications could readily be made which would still come within the scope of my invention.

I therefore desire to secure the following claims by Letters Patent:

1. In trolley pole controlling mechanism, the combination of a supporting base having a pivot extension, a trolley pole pivoted at its lower end to said extension, a stationary block, a ring journaled on said block concentric with said pivot extension, an arm pivoted at its lower end to said ring, and means supported by the ring for swinging the arm to hold its upper end against the pole.

2. In trolley pole controlling mechanism, the combination of a supporting base having a pivot extension, a trolley pole pivoted at its lower end to the extension, a block, a member mounted rotatively on said block concentrically with the extension, an arm pivoted at its lower end to the member, means at the upper end of the arm for receiving the pole, the pole being longitudinally movable through said means, and spring mechanism acting on the arm to hold the pole in upright position.

3. In trolley pole controlling mechanism, the combination of a rigid supporting base having a pivot extension, a trolley pole pivoted at its lower end to the extension, a block, a member mounted rotatively on said block concentrically with the extension, an arm pivoted at its lower end to the member, means at the upper end of the arm for receiving the pole, the pole being longitudinally movable through said means, spring mechanism carried by the member and acting against the arm to swing the arm upwardly against the pole to hold the pole in upright position, and stop mechanism for limiting the swing of the arm.

4. In trolley pole controlling mechanism, the combination of a rigid base having a vertical bearing extension, a supporting member journaled in said extension; a trolley pole pivoted at its lower end to said member, a horizontal supporting plate rotatable on said base concentrically about said extension, an arm pivoted at its lower end to the plate, means at the upper end of the arm for confining the pole thereto, said pole being longitudinally movable through said means, and spring mechanism carried by the plate for swinging the arm upwardly to hold the pole in upright operative position.

5. In trolley pole controlling mechanism, the combination of a rigid base having a vertical bearing extension, a supporting member journaled in said extension; a trolley pole pivoted at its lower end to said member, a horizontal supporting plate rotatably concentrically about said member, an arm pivoted at its lower end to the plate, means at the upper end of the arm for confining the pole thereto, said pole being longitudinally movable through said means, spring mechanism carried by the plate for swinging the arm upwardly to hold the pole in upright operative position, and stop means for limiting the upward swing of said arm.

6. In trolley pole controlling mechanism, the combination of a base, a trolley pole having pivot connection with said base, a block adjacent said base, a plate rotatably mounted on said block and concentric with said pivot connection, an arm pivoted to said plate, spring mechanism engaging the arm to press it against the pole to thereby hold the pole in upright position, there being notches on said block, and pawl mechanism carried by the plate for coöperating with said notches to resist rotation of said plate and thereby lateral swaying of the pole.

7. In trolley pole controlling mechanism, the combination of a rigid base comprising two concentric annular portions, a pin pivoted in the inner annular portion, a trolley pole pivoted to said pin, said outer annular portion having a peripheral groove, an annulus journaled in said groove, an arm pivoted to the edge of said annulus and extending upwardly into engagement with said trolley pole, a spring for holding the arm against the trolley pole, and stops on the arm coöperating with said annulus to limit the swing of said arm.

8. In trolley pole controlling mechanism, the combination of an annular base, a trolley pole pivoted at the center of said base, said base having a peripheral groove, a plate journaled in said groove, an arm pivoted at the edge of said plate, a strap at the upper end of said arm for slidingly receiving said pole, and a spring secured to the plate and abutting against said arm to hold said arm against said trolley pole to support the pole in upright position.

9. In trolley pole controlling mechanism, the combination of a stationary base having an inner and an outer annular portion, a vertical pin journaled in said inner portion, a trolley pole pivoted to said pin, a plate journaled to said outer portion to rotate concentrically about the inner portion, an arm pivoted at its lower end at the edge of said plate, a strap at the upper end of said arm slidingly receiving said pole, a spring tending to swing the arm upwardly to hold the pole in upright operative position, and stops on the arm coöperating with said plate to limit the swing of said arm.

10. In trolley pole controlling mechanism, the combination of an annular base having a peripheral groove, a plate rotatably mounted in said groove, a trolley pole journaled at the center of said base, an arm pivoted at its lower end at the edge of said plate and having a groove in its free end for receiving the trolley pole, a spring secured to the plate and engaging directly with said arm to press said arm against the pole and a U shaped strap 20 pivoted to the arm and looping about the pole to hold said pole in the groove of said arm.

11. In trolley pole controlling mechanism, the combination of an annular base having a peripheral groove, a plate rotatably mounted in said groove, a trolley pole journaled at the center of said base, an arm pivoted at its lower end at the edge of said plate and having a groove in its free end for receiving the trolley pole, a spring secured to the underside of said plate and engaging the lower end of said arm to swing the upper end thereof against the pole, a U shaped strap 20 pivoted to the arm and looping about the pole to hold said pole in the groove of said arm, and stop extensions 15 and 16 at the lower end of said arm coöperating with said plate to limit the upward and downward swing of said arm and thereby of said pole.

In testimony whereof I have signed my name to this specification in the presence of two subscribing witnesses.

MICHAEL KERN.

Witnesses:
 GEO. S. PINES,
 OSCAR HILDEBRAND.

Copies of this patent may be obtained for five cents each, by addressing the "Commissioner of Patents, Washington, D. C."